United States Patent Office 2,780,552
Patented Feb. 5, 1957

2,780,552

DEHYDRATION OF COOKED POTATO

Miles J. Willard, Jr., Glenside, and James Cording, Jr., Philadelphia, Pa., assignors to the United States of America as represented by the Secretary of Agriculture No Drawing. Application April 1, 1954,
Serial No. 420,475

2 Claims. (Cl. 99—207)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the dehydration of cooked, mashed potato.

The object of this invention is to provide processes for the dehydration of cooked, mashed potato whereby a product is produced that has good storage stability and that may be quickly and easily reconstituted to yield mashed potato having substantially the color, flavor and consistency of fresh mashed potato.

Many processes for the dehydration of potatoes, both raw and cooked, have been proposed. All such methods, especially those applicable to cooked potatoes, suffer from one or more serious drawbacks. Some yield a product that is discolored or has an objectionable flavor; some destroy the cell structure of the potato, thus liberating the starch and yielding a product that reconstitutes to a pasty consistency; still others yield an acceptable product but are so expensive as to be impractical.

We have now discovered a simple and inexpensive process whereby cooked, mashed potato may be dehydrated to yield a stable product that can be instantly reconstituted by the addition of water or milk, at temperatures from cold to boiling, to produce mashed potato substantially equal to fresh mashed potato in appearance, flavor and consistency.

According to the invention, mashed potato is fed continuously onto a heated, rotating drum, roller or other surface in a closely regulated thin film which dries quickly and is then removed. Drum driers have previously been used to dry many substances, including mashed potatoes. For the latter use, however, they have not heretofore been satisfactory. The products made with them were either lumpy or pasty when reconstituted. We have observed that if the film of potato applied to the drum is too thin, the product has a large proportion of its cells ruptured and contains much free starch; hence, is pasty when reconstituted. On the other hand if the film is too thick, the product contains lumps that are slow to dry and slow to reconstitute, hence the reconstituted product is grainy. Between these extremes, we have discovered, there is a critical film thickness such that the potato dries quickly and uniformly, yielding a product which contains little free starch and which reconstitutes almost instantaneously to yield mashed potato of smooth and pleasing texture and consistency and has unimpaired color and flavor.

For best results, the mashed potato should be applied to the drier surface in a substantially monocellular layer. The cells of cooked mashed potato are usually more or less spherical or somewhat elongated ellipsoidal in shape. The length of most of the cells is in the range of about 0.005 to 0.012 inch, the width being slightly less. In using a double drum drier, the clearance between the drums should be in the range of about 0.005 to 0.015 inch, and preferably in the range of about 0.007 to 0.010 inch. We have found that product quality is best when the thickness of the dried flake is between .004″ and .006″. Flakes measuring .001″ to .003″ show excessive cell rupture. Flakes measuring .007″ and over show increasing agglomeration of cells.

In operation of a double drum drier, the preferred clearance range of .007″ to .010″ produces flakes predominantly 0.004″ to .006″ thick which reconstitute quickly to a smooth but not pasty consistency. Operation in the higher clearance range up to 0.015″ produces flakes of about 0.008″ thickness with a higher amount of cell agglomeration. These agglomerates do not reconstitute as quickly as flakes of the preferred thickness and are at first grainy, but on continued contact with the liquid eventually become smooth and satisfactory in all respects.

In operation of a single drum drier also the film thickness applied to the drum must be adjusted to produce a dried flake preferably in the range of thickness of from 0.004″ to 0.006″, which will reconstitute quickly to a smooth but not pasty consistency. The drying surfaces in contact with the potato should be made of material which will not discolor or otherwise contaminate the product.

The drums should be internally heated, suitably by steam at an appropriate pressure. The temperature should be as high as possible without causing darkening or other injury to the product, and will depend on size of the rolls, the rate at which they revolve, the film thickness of the potato applied, and the moisture desired in the dried flake.

In order to have the desired storage stability, the product must be reduced to a final moisture content of about 4 to 10% and preferably 4 to 8%. This can be done in one step on the drum drier, or it can be done in two steps. In the first step of the two-step process, the moisture is reduced to a point where the product can still be removed from the drum or drums in a continuous film. We have found that at a moisture content above about 25% the dried product cannot be conveniently removed as a continuous monocellular film. Drying on the heated surface to reduce the moisture content to about from 11.8 to 25% is satisfactory. In the second step this film is removed from the drum and the drying is completed in air by use of any convenient equipment; for instance, a tray, or pneumatic drier or a tunnel drier through which the potato is carried on a belt or other conveyor. The two-step process has the advantage that it increases the capacity of the drum drier several fold because it permits use of a higher temperature and a higher speed of the drum.

Potatoes to be dried may be cooked and mashed by any convenient method. In the examples described below they were peeled by use of an abrasion peeler, trimmed by hand to remove spots and eyes, sliced into one-quarter inch slabs, rinsed to remove free starch, cooked with live steam at atmospheric pressure for 35 to 45 minutes, and mashed by passing them through flaking rolls. These rolls were 12 inches in diameter, were set for 0.05 inch clearance and had grooves cut in their surfaces parallel to the axis of rotation and were driven at slightly different speeds to improve their bite.

Previous investigators have shown that addition of a trace of calcium chloride strengthens potato cell walls and helps minimize cell rupture during processing. We have found that the addition of a 3% aqueous solution of calcium chloride to give a concentration of 0.05% in the mash to the potato soon after mashing results in some improvement in the final product, although a highly satisfactory product can be made without it.

Another recognized method of strengthening the cell walls is to store the mashed potato, preferably with refrigeration, for periods up to 24 hours. While both long storage and refrigeration are of some value, the improvement in the product does not ordinarily justify the added expense. We have found it desirable to hold the potatoes for 30 to 60 minutes after mashing and before drying.

The drum drier used in the examples described below had two stainless steel rolls 6 inches in diameter and 7⅝ inches long and having a total surface area of 2 square feet. The surface actually used in drying extended from the pinch to a knife-edge scraper, this being about ⅔ of the circumference of the rolls. The rolls were mounted side by side and rotated at equal rates and in opposite directions. They were internally heated by steam at a controlled pressure, so that their temperature could be accurately adjusted. The data in Table I summarize several experiments.

*Table I.—Drum drying of mashed potato*

| Expt. No. | Steam Pressure on Rolls, p. s. i. | Temp., °F. | Clearance of Rolls, mils | Residence Time, sec. | Moisture in Product, percent |
|---|---|---|---|---|---|
| 1 | 40 | 287 | 8 | 15 | 7.0 |
| 2 | 63 | 310 | 8 | 12 | 7.0 |
| 3 | 82 | 324 | 8 | 9 | 6.7 |
| 4 | 68 | 314 | 4 | 10 | 5.7 |
| 5 | 42 | 289 | 13 | 25 | 11.8 |
| 6 | 42 | 289 | 17 | 25 | 13.1 |
| 7 | 25 | 267 | 7 | 15 | 17.6 |

The products of Experiments 1–3 were excellent in every respect. That of Experiment 4 contained an excessive proportion of ruptured cells and free starch; hence, on reconstitution it had an undesirable pasty consistency. The product of Experiment 5 was slightly grainy when reconstituted, though not enough to detract seriously from its value. In addition its high moisture content rendered it unstable in storage. The latter fault was eliminated when the material was further dried to a moisture content of about 7% by use of a circulating air drier of the tray, tunnel or pneumatic type. The product of Experiment 6 not only required further drying but also was very grainy and was not a satisfactory product. That of Experiment 7 required further drying to achieve storage stability but otherwise was a highly satisfactory product. Experiment 2 of Table I is described below as an example of our invention in operation to produce a preferred product.

Idaho russet potatoes, U. S. No. 1, size A, were peeled lightly in an abrasion peeler, trimmed by hand to remove spots and eyes, sliced into ¼-inch-thick slabs, rinsed to remove free starch, cooked with live steam at atmospheric pressure for 35 minutes, and mashed by passing them through flaking rolls set 0.050″ apart.

A microscopic examination to determine the cell size in this mash indicated that 90% of the cells measured from 0.005″ to 0.012″ on their longest axis. Two (2) percent were over 0.012″ and eight (8) percent were under 0.005″.

A 3 percent calcium chloride solution was added to this mash, with stirring in a small mixer, at the rate of 61 grams per eight-pound batch of mash. The mash was then held at about 120° F. for 45 minutes. The clearance between the drums of a double drum drier was set for 0.007–0.009″ and the drum speed was set to give a residence time of 12 seconds. The mash was fed to the drums which were operated with a steam pressure of 63 pounds per square inch gauge and a product recovered containing 7 percent moisture and having a thickness of 0.004 to 0.006″. This product was reconstituted by adding to 30 grams of the flakes, a solution obtained by mixing 103 grams of boiling water and 35 grams of milk at room temperature and stirring for about one minute. The reconstituted product was satisfactory in appearance and texture being neither pasty nor grainy and closely resembled freshly prepared mashed potatoes in flavor.

Dried potato prepared according to the invention is obtained in the form of thin, porous flakes having an optimum thickness of about 4 to 6 mils (0.004 to .006 inch). Because of this extreme thinness of the flakes, in addition to their porosity, the product can be reconstituted almost instantly by mixing with an appropriate amount of water or milk. The liquid may be at any temperature between room temperature and the boiling point.

We claim:

1. A process comprising drying cooked mashed potato to a final moisture content of 4 to 10%, at least the initial drying being accomplished by drying the cooked mashed potatoes on a heated surface in a film substantially of monocellular thickness.

2. The process of claim 1 wherein the moisture content of the cooked mashed potato is reduced to about 11.8 to 25% on the heated surface and the drying is then completed in air.

References Cited in the file of this patent

UNITED STATES PATENTS

| 1,908,489 | Sartakoff | May 9, 1933 |
| 2,190,063 | Gano | Feb. 13, 1940 |
| 2,352,670 | Volpertas | July 4, 1944 |
| 2,381,838 | Rendle | Aug. 7, 1945 |
| 2,401,392 | Ware et al. | June 4, 1946 |

FOREIGN PATENTS

| 436,353 | Great Britain | Oct. 9, 1935 |